Oct. 9, 1934.   G. BELFILS ET AL   1,976,475
ELECTRIC VALVE CONVERTING APPARATUS
Filed March 30, 1934
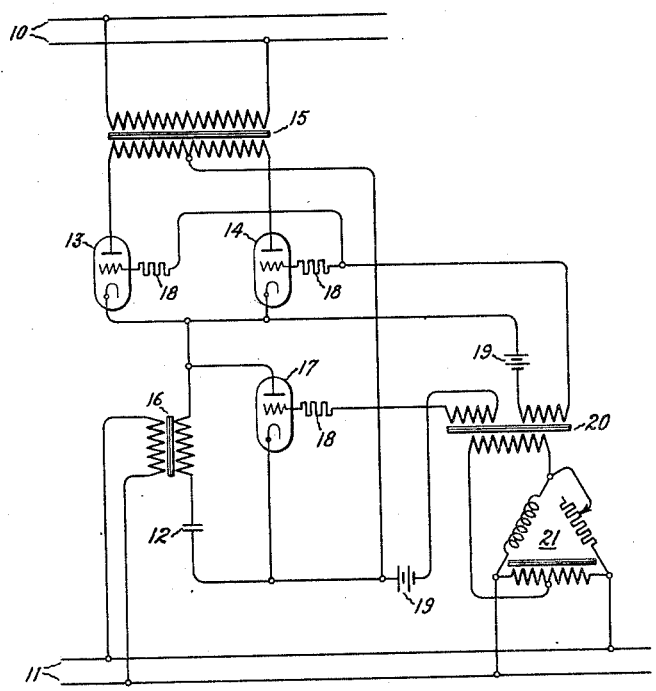
Inventors:
Georges Belfils,
Jean A. Augier;
by Harry E. Dunham
Their Attorney.

Patented Oct. 9, 1934

1,976,475

UNITED STATES PATENT OFFICE 1,976,475

ELECTRIC VALVE CONVERTING APPARATUS

Georges Belfils and Jean A. Augier, Belfort, France, assignors to General Electric Company, a corporation of New York Application March 30, 1934, Serial No. 718,228
In France April 14, 1933

3 Claims. (Cl. 172—281)

Our invention relates to electric valve converting apparatus and more particularly to such apparatus for transmitting energy between independent alternating current circuits.

Heretofore there have been devised numerous electric valve converting apparatus for transmitting energy between direct and alternating current circuits, direct current circuits of different voltages, or independent alternating current circuits, that is, alternating current circuits, the phase and frequency relations of the voltages of which are not independently fixed. In the arrangements of the prior art, apparatus of this last class has generally been quite complex and costly, involving a considerable number of electric valves and their associated control circuits.

It is an object of our invention to provide a new and improved electric valve converting apparatus for transmitting energy between independent alternating current circuits which will substantially simplify the arrangements of the prior art and will be economical and reliable in operation.

In accordance with our invention, energy is transmitted between independent alternating current circuits by apparatus of the series type in which a capacitor is connected to be charged from the supply circuit through a group of electric valves connected to supply unidirectional current thereto. A discharge circuit is provided for a capacitor including a single additional electric valve. The group of rectifying valves and the electric valve in the discharge circuit of the capacitor are alternately rendered conductive, while the load circuit is common to the charging and discharging circuits of the capacitor.

For a better understanding of our invention, together with other and further objects thereof, reference is had to the following description taken in connection with the accompanying drawing, and its scope will be pointed out in the appended claims. The single figure of the drawing is a diagrammatic representation of our invention as applied to an apparatus for transmitting energy from a single phase alternating current supply circuit to an independent single phase alternating current load circuit.

Turning now more particularly to the drawing, there is illustrated an apparatus embodying our invention for transmitting energy from a single phase alternating current supply circuit 10 to an independent single phase alternating current load circuit 11. This apparatus includes a capacitor 12 and a pair of electric valves 13 and 14 and a transformer 15 connected in a conventional manner to supply full wave rectified current to charge capacitor 12 from the source 10. The charging circuit of the capacitor 12 also includes the primary winding of an output transformer 16, the secondary winding of which is connected to the load circuit 11. The capacitor 12 is provided also with a discharge circuit including the primary winding of the transformer 16 and a single additional electric valve 17. Each of the electric valves 13, 14 and 17 is provided with an anode, a cathode and a control electrode or grid and may be of any of the several types well known in the art although we prefer to use valves of the vapor or gaseous electric discharge type.

In order to render alternately conductive the group or pair of electric valves 13 and 14 and the electric valve 17, their control electrodes, or grids, are connected to their respective cathodes through current limiting resistors 18, negative bias batteries 19 and the secondary windings of a control transformer 20. The primary windings of the control transformer 20 may be energized from any suitable source of alternating current of a frequency which it is desired to impress upon the circuit 11, or, in case the circuit 11 is energized from an independent source of electromotive force for determining its frequency and wave form, the primary winding of the transformer 20 may be energized therefrom through any suitable phase adjusting means, such as an impedance phase shifting bridge 21.

In considering the operation of the above described apparatus, it will be assumed that, initially, a positive potential impulse is impressed upon the grids or control electrodes of the electric valves 13 and 14. These electric valves and the transformer 15 act as a full wave rectifier to supply unidirectional current to charge the capacitor 12 from the supply circuit 10, this charging current flowing through the primary winding of the output transformer 16 and constituting one-half cycle of alternating current of the load circuit 11. In general, there will be an appreciable amount of reactance in the output transformer 16 and the load circuit 11 which will oscillate with the capacitor 12 to charge it to a potential greater than the maximum value of the potential of the supply circuit 10, thus impressing a negative potential upon the anodes of the electric valves 13 and 14 to aid in the interruption of current therein. Substantially 180 electrical degrees later with respect to the load circuit 11, the control potential supplied by the transformer 20 will reverse polarity, maintaining electric valves 13 and 14 non-conductive and rendering conductive electric valve 17. This valve is effective to discharge the capacitor 12 through the primary winding of the output transformer 16, delivering a half cycle of alternating current of opposite polarity to the load circuit 11. The reactance of the alternating current circuit oscillating with the capacitor 12 will again aid in the extinction of the current in the electric valve 17. The phase shifting circuit 21 is effective to control the phase relations of the potentials impressed upon the grids of the several electric valves with respect to the potentials of the alternating current circuit 11 to secure optimum commutation. The operation of the system will be substantially similar whether the frequency of the load circuit 11 is above or below that of the supply circuit. In case the frequency of the supply circuit is the higher electric valves 13 and 14 may supply several half cycles of the supply frequency for each charging operation of the capacitor 12. On the other hand, if the frequency of the load circuit 11 is the higher, a single half cycle of the supply circuit 10 will be effective for several charging operations of the capacitor 12.

While we have described what we at present consider the preferred embodiment of our invention, it will be obvious to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States is:

1. An electric valve frequency changing apparatus for transmitting energy between independent alternating current supply and load circuits comprising a capacitor, a circuit for charging said capacitor with unidirectional current from said alternating current supply circuit including a group of electric valves, a circuit for discharging said capacitor including a single other electric valve, means for rendering alternately conductive said group of valves and said other valve, and means for energizing said load circuit from the charging and discharging currents of said capacitor.

2. An electric valve frequency changing apparatus for transmitting energy between independent alternating current supply and load circuits comprising a capacitor, a group of electric valves for rectifying current from said supply circuit and charging said capacitor therefrom, a single other electric valve connected to discharge said capacitor, each of said valves being provided with a control electrode, a circuit for alternately impressing positive potentials upon the control electrodes of said group of valves and that of said other valve at the frequency which it is desired to supply said load circuit, and means for energizing said load circuit from the charging and discharging currents of said capacitor.

3. In combination, an alternating current supply circuit, an independent alternating current load circuit, a capacitor, a group of electric valves interconnecting said supply circuit and said capacitor to supply rectifier current thereto, a single other electric valve connected to discharge said capacitor, each of said valves being provided with a control electrode, and a circuit for alternately impressing positive potentials upon the control electrodes of said group of valves and that of said other valve at the frequency which it is desired to supply said load circuit, said load circuit being connected in series with said capacitor.

GEORGES BELFILS.
JEAN A. AUGIER.